(12) United States Patent
McClure

(10) Patent No.: US 7,352,576 B2
(45) Date of Patent: Apr. 1, 2008

(54) MULTI-PROCESSOR SYSTEM AND TUBELIKE COMPUTER MODULE THEREOF

(75) Inventor: John McClure, Taipei (TW)

(73) Assignee: Tyan Computer Corporation, Taipei (TW)

( * ) Notice: Subject to any disclaimer, the term of this patent is extended or adjusted under 35 U.S.C. 154(b) by 59 days.

(21) Appl. No.: 11/482,809

(22) Filed: Jul. 10, 2006

(65) Prior Publication Data

US 2007/0247809 A1 Oct. 25, 2007

(30) Foreign Application Priority Data

Apr. 19, 2006 (TW) .............................. 95114000 A

(51) Int. Cl.
*H05K 7/20* (2006.01)
(52) U.S. Cl. ..................... 361/695; 361/690; 361/694; 361/715; 361/610; 361/725; 361/727; 454/184
(58) Field of Classification Search .................... None
See application file for complete search history.

(56) References Cited

U.S. PATENT DOCUMENTS

| 3,420,381 | A | * | 1/1969 | Bradfield | 211/26 |
| 3,434,014 | A | * | 3/1969 | Taynton | 361/695 |
| 3,662,225 | A | * | 5/1972 | Carter et al. | 361/784 |
| 5,063,475 | A | * | 11/1991 | Balan | 361/687 |
| 5,150,279 | A | * | 9/1992 | Collins et al. | 361/686 |
| 5,289,694 | A | * | 3/1994 | Nordin | 62/259.2 |
| 5,406,452 | A | * | 4/1995 | Uchiumi | 361/727 |
| 5,586,004 | A | * | 12/1996 | Green et al. | 361/699 |
| 5,903,432 | A | * | 5/1999 | McMahon | 361/690 |
| 6,778,389 | B1 | * | 8/2004 | Glovatsky et al. | 361/690 |
| 2005/0024821 | A1 | * | 2/2005 | Arippol | 361/686 |

* cited by examiner

*Primary Examiner*—Gregory D Thompson
(74) *Attorney, Agent, or Firm*—Geissler, Olds & Lowe, PLLC

(57) ABSTRACT

A multi-processor system has a tubelike computer module including plural mother boards configured onto plural side walls of a rack body to form a unitary, continuous and non-segment airflow channel. The airflow channel of the tubelike computer module has larger space and fewer barriers to allow the airflow passing through smoothly, and to reduce wind noises or turbulences. Therefore, the system achieves optimum heat-dissipation efficiency and noise reduction by means of specific space arrangement and less cooling system requirement.

20 Claims, 7 Drawing Sheets

MULTI-PROCESSOR SYSTEM AND TUBELIKE COMPUTER MODULE THEREOF

BACKGROUND OF THE INVENTION

1. Field of Invention

The present invention relates to a multi-processor system, and more particularly to a multi-processor system that has a non-segment airflow channel in a rack body.

2. Related Art

The highly-compact characteristic of blade architecture brings blade severs specific advantages of high density, management convenience, expansibility and adaptation to particular applications. Generally, blade sever is one of the optimum choices for a small-sized HPC (High Performance Computing). However, high-density blade architecture is disadvantageous to heat dissipation due to the extreme heat generated from an HPC system and the difficulty of cooling through the split, narrow airflow channels. Some systems utilize liquid cooling systems that have high heat-dissipating efficiency. Sure the cost and the production complexes come along.

As shown in FIG. 1, a personal supercomputer 1 is provided in the prior art for performing small-scale but high-complex computing tasks on blade architecture. The front portion of the inner space of a rack 10 is configured with plural mother boards 11, wherein all the mother boards 11 are spaced at intervals to split the front portion of the inner space of the rack 10 into several narrow split spaces as airflow channels, as the common blade architecture. The rear portion of the rack 10 is configured with power supply modules 12 in the bottom half and several fans 13 in the top half for generating cooling airflows 14. The airflows 14 sucked-in from the front side of the rack 10 will first flow into each of the split spaces, then pass the fans 13 and eventually flow out through the rear side of the rack 10.

The major problem of the architecture mentioned above is that narrow split spaces are not advantageous to heat dissipation and noise reduction. The flow rate of the airflows 14 at unit time and unit section area positively relates to the heat brought away from the system, while the impact between the airflow molecules and the objects (electrical members and unsmooth surfaces) of the mother boards 11 configured along the airflow path in the split spaces contributes to wind noises. However, in blade architecture, narrow split spaces generate more serious turbulences that lower the flow rate of the airflows and lead to more wind noises. To enable required flow rate of the airflows 15, and to reach enough wind pressure of the airflows 14 to flow in/out all the tiny channels between each of the heat fins 111, the fans 13 needs to remain much higher rotation speeds, which also cause operation noises of high decibel.

SUMMARY OF THE INVENTION

To solve the technical problems in the prior art, the present invention discloses a multi-processor system and a tubelike computer module thereof to define a unitary, continuous and non-segment airflow channel. The airflow channel of the tubelike computer module has larger space and fewer barriers to allow the airflow passing through smoothly, and to reduce wind noises or turbulences. Therefore, the system achieves optimum heat-dissipation efficiency and noise reduction by means of specific space arrangement and less cooling system requirement.

In an embodiment according to the present invention, a tubelike computer module includes a rack body and plural mother boards. The rack body has plural adjacent side walls to form a first opening and a second opening, while the mother boards each has at least one processor. Each of the mother boards are configured onto the side walls respectively, thereby defining a non-segment airflow channel between the first opening and the second opening.

In a practical embodiment for the tubelike computer module, each of the side walls is rotatably pivoted onto the rack body to enable rotation relative to the rack body. Besides, the tubelike computer module may further include at least one hard disk configured on the side walls or the mother boards, or between the side walls and the mother boards. The hard disk is practically arranged parallel to the coupled side walls or the coupled mother boards. The tubelike computer module may further include at least one cooling fan at the path of the airflow channel. In another practical case, the shape of the rack body is a polygon pillar or a polyhedron.

In another embodiment according to the present invention, a multi-processor system includes a rack body, plural mother boards, plural heat sinks and at least one cooling fan. The rack body has a plurality of adjacent side walls to form a first opening and a second opening. The mother boards each has at least one processor, and each of the mother boards is configured onto the side walls respectively to define a non-segment airflow channel between the first opening and the second opening. The heat sinks are coupled corresponding to the processors of the mother boards. And the cooling fan is configured at the path of the airflow channel for generating an airflow through the airflow channel.

In a practical embodiment for the multi-processor system, each of the side walls is rotatably pivoted onto the rack body to enable rotation relative to the rack body. The rack body may further includes a top cover coupled to the first opening of the rack body, the top cover having a plurality of through holes. Besides, the cooling fan is practically configured at the first opening or the second opening, or in the top cover. The multi-processor system may further include at least one hard disk configured in the rack body or in the top cover.

In a practical embodiment for the multi-processor system, the multi-processor system further includes a pedestal configured at the second opening of the rack body, wherein the pedestal includes a plurality of power supply modules that equipped with centrifugal fans. The pedestal may further include a plurality of apertures for the airflow. Or, the cooling fan may be configured in the pedestal. The pedestal may further include one or more system switches or at least one hard disk. In a practical case, the shape of the rack body is a polygon pillar or a polyhedron.

In another practical embodiment for the multi-processor system, the multi-processor system further includes a second rack body with a second airflow channel coupled to the first opening or the second opening of the rack body, thereby enabling the airflow channel and the second airflow channel thereof to link together.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

Figure 2A:
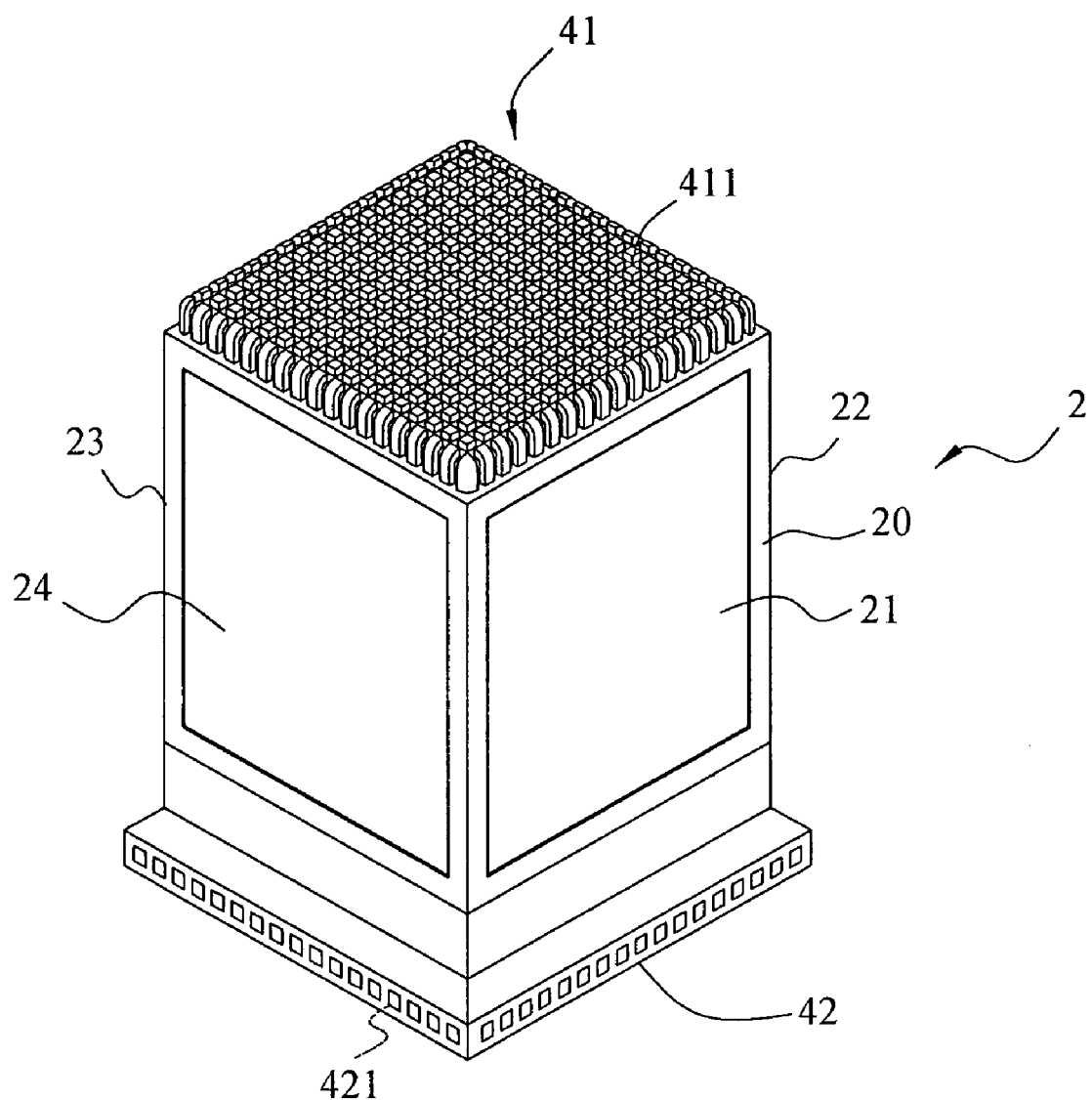
FIG. 2A shows an explanatory drawing of a multi-processor system according to the present invention.
Figure 2B:
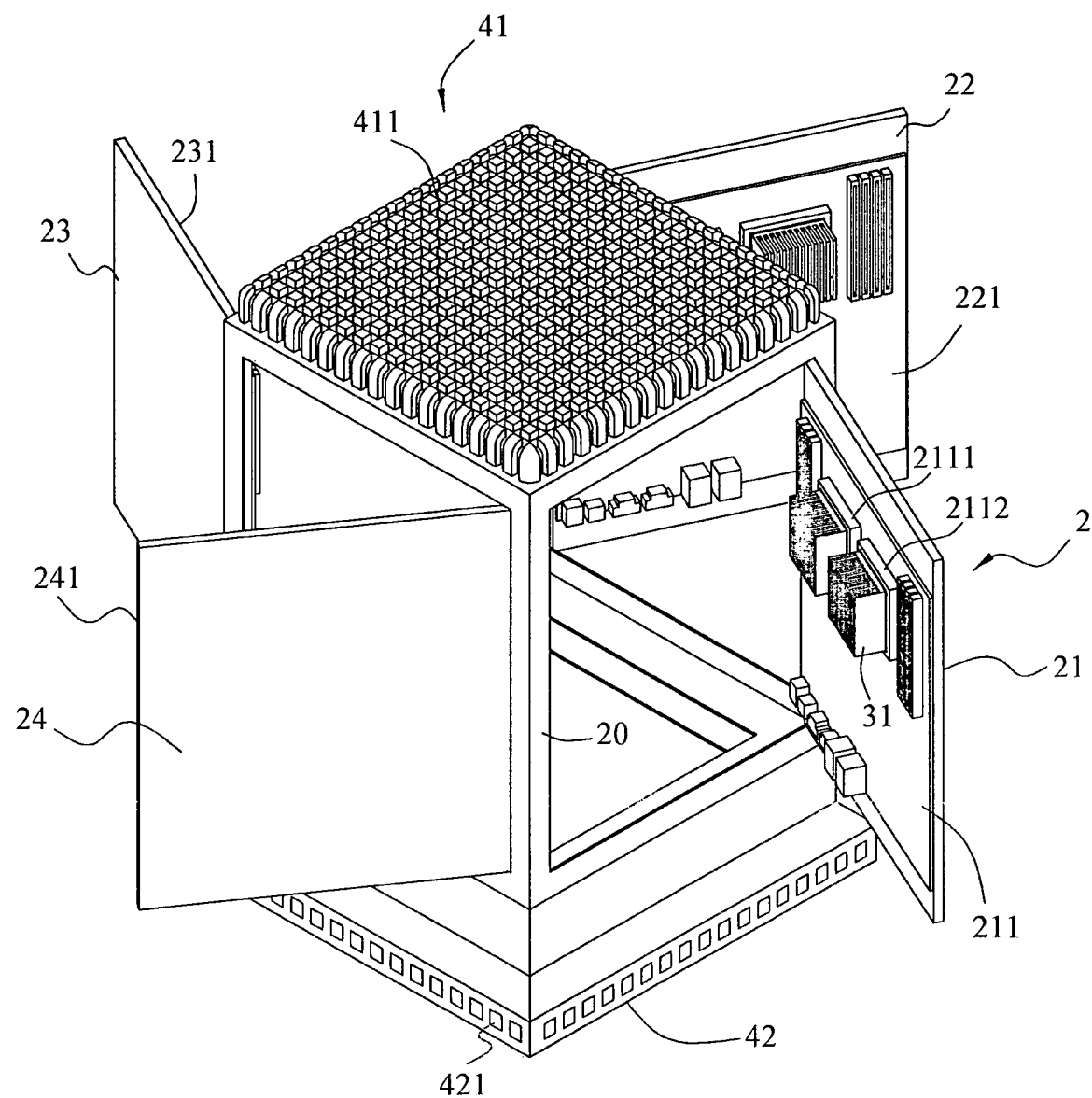
FIG. 2B is an explanatory drawing of a multi-processor system according to the present invention, showing the opening state of side walls.
Figure 3:
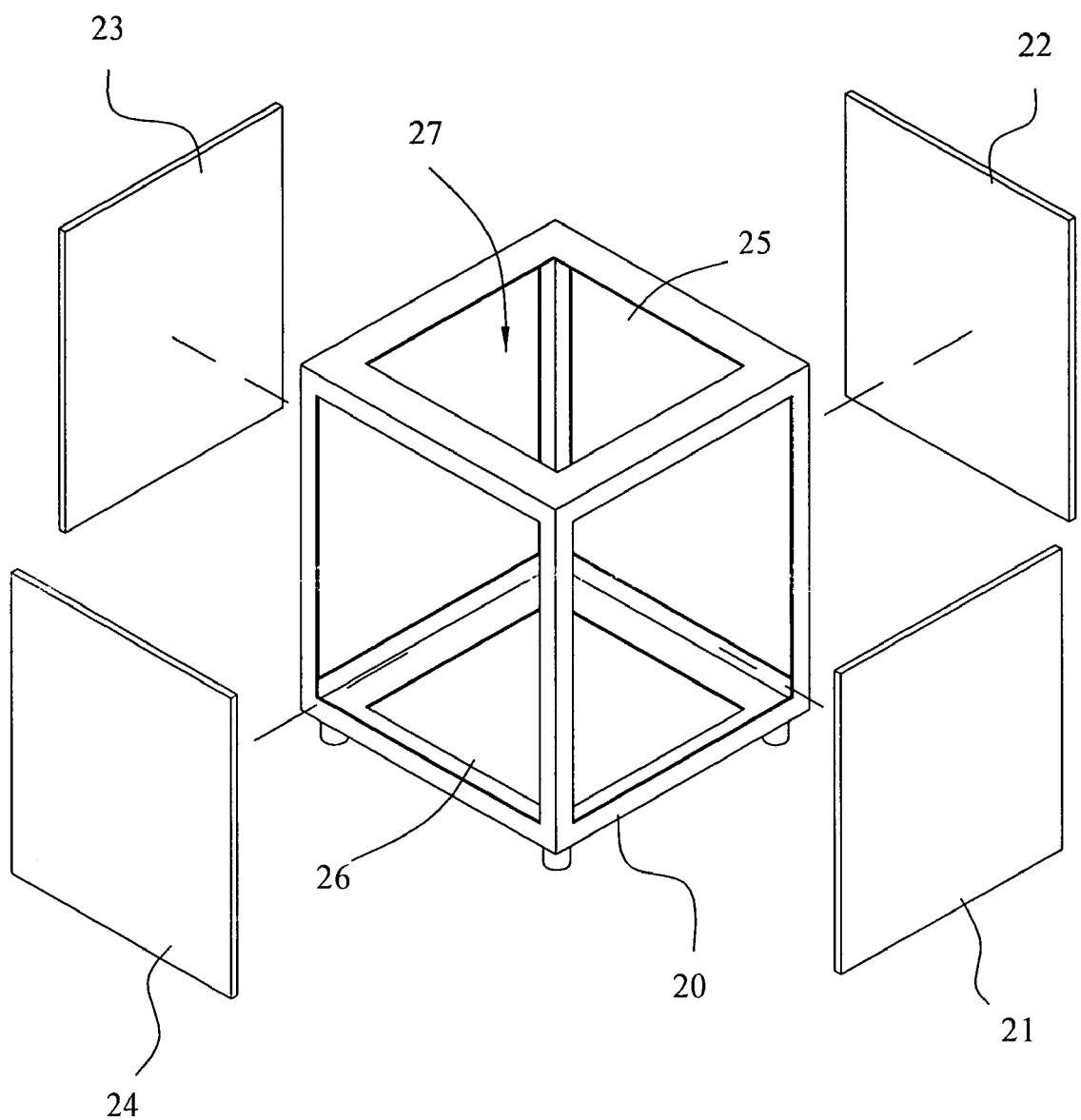
FIG. 3 is an explanatory drawing for the rack body of the tubelike computer module according to the present invention.

Please refer to FIGS. 2A and 2B. The multi-processor system according to the present invention includes a tubelike computer module 2, several heat sinks 31 and one or more cooling fans 32,33. The tubelike computer module 2 has a rack body 20 and four mother boards 211, 221, 231, 241. Please also refer to FIG. 3. The rack body 20 has a rectangular framework. The four sides of the rack body 20 are configured with four rectangular side walls 21, 22, 23, 24 to form a first opening 25 and a second opening 26 opposite at the rest two sides (the top and bottom ones in the drawings) of the rack body 20. Therefore, a unitary, continuous and non-segment airflow channel 27 (FIG. 3) is formed between the first opening 25 and the second opening 26 to allow airflow to florid through the rack body 20.

Figure 1:
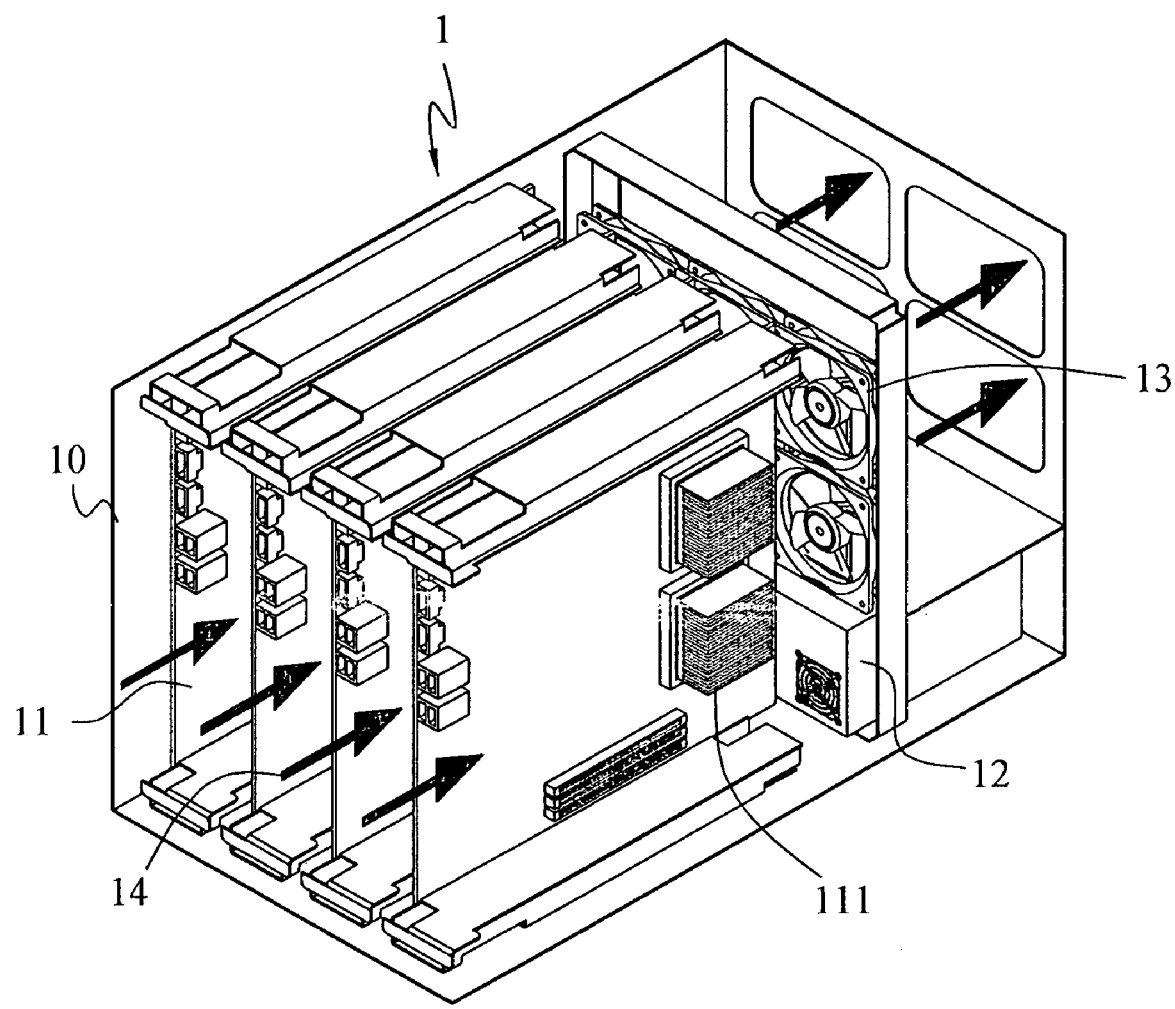
FIG. 1 is an explanatory drawing for a personal super-computer with blade architecture in the prior art.

The mother boards 211, 221, 231, 241 are configured respectively onto the side wall 21, 22, 23, 24. All of the mother boards and the side walls are rectangular, generally the same as a regular, square-like mother board shape. Differing from the blade arrangement of the prior art (as shown in FIG. 1) with mother boards spaced at intervals, the mother boards 211, 221, 231, 241 are coupled parallel and closely to the inner surfaces of the side wall 21, 22, 23, 24. The inner space of the rack body 20 is reserved as a whole airflow channel 27, without any split narrow channels. Meanwhile, all the rear sides of the mother boards 211, 221, 231, 241 are hidden between the mother boards 211, 221, 231, 241 and the side wall 21, 22, 23, 24, so the unsmooth rear surfaces of the mother boards 211, 221, 231, 241 will not be barrier against the airflow. For those skilled in the art, the shape of the rack body, the shape of the first and second openings, and the amount or shape of the side walls can be easily changed to meet other requirements, which should not be taken as limitations of the present invention. In general, all polygon pillars, even polyhedrons are practical to build up a tubelike rack body. In some specific cases, the airflow channel may not be straight; which means the first opening may be not straightly opposite to the second opening.

Each of the mother boards 211, 221, 231, 241 has plural processors configured thereon. For example, the mother board 211 has two processors 2111, 2112. Each of the processors 2111, 2112 is configured with dedicated heat sinks 31 respectively. The heat sinks 31 may has fins only or further include a cooling fan or other heat-dissipation modules to carry away the heat generated from the operating processor 2111, 2112. The amount of the processors influences only the generated heat and the space arrangement on a mother board, but not the application of the present invention. The embodiment may be perfectly applied to a clustering system that has lower nodes. However, the technical features of the present invention are applicable to other symmetric computer systems, such as a symmetric multi-processor system or a distributed memory multi-processor system.

Figure 4:
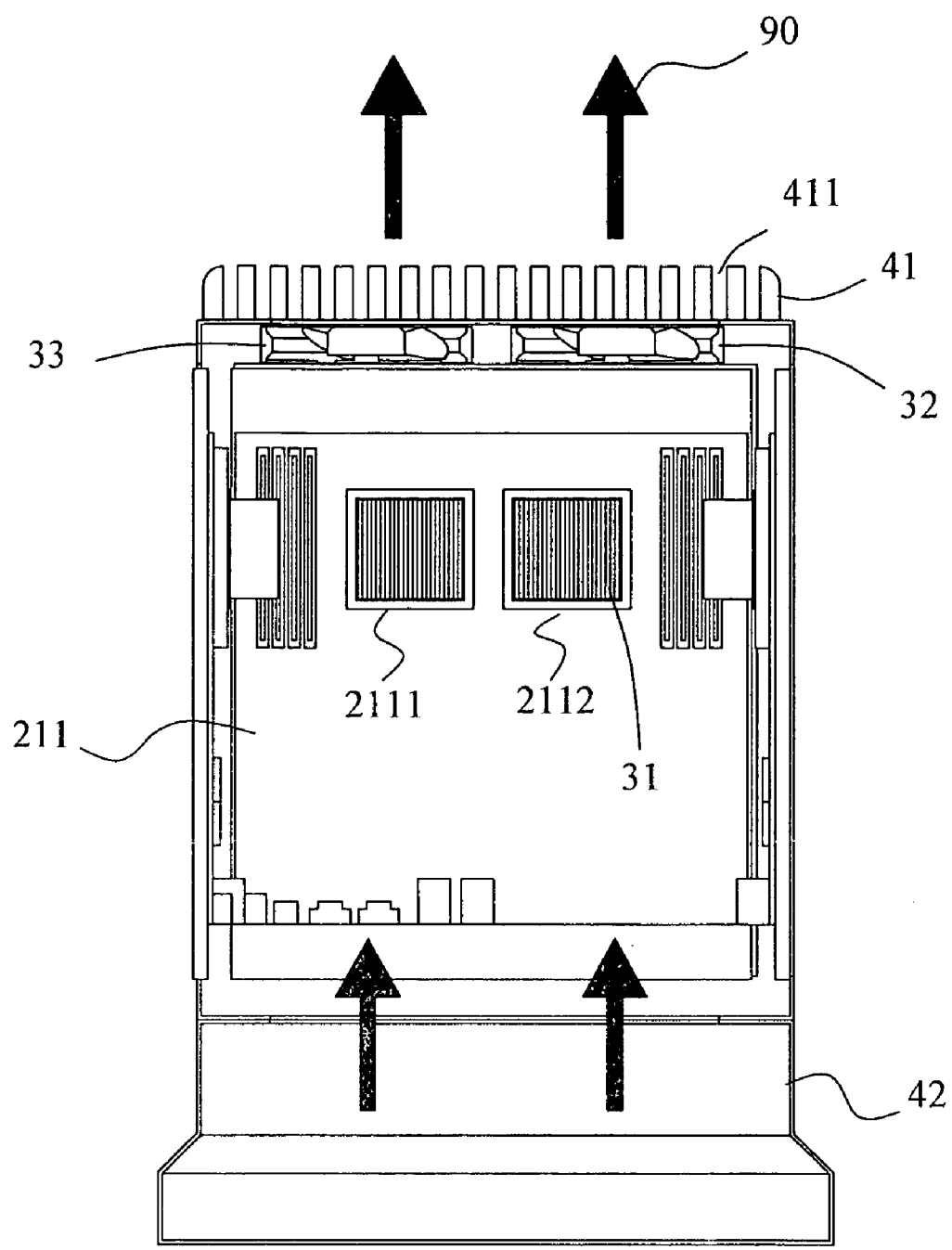
FIG. 4 is an explanatory drawing in a cross-section view for the multi-processor system according to the present invention.

Please refer to FIGS. 2B and 4. To enable a easy configuration of the mother boards 211, 221, 231, 241, the side walls 21, 22, 23, 24 apply their specific sides rotatably pivoted to the rack body 20. Therefore, the side walls 21, 22, 23, 24 are capable of rotation relative to the rack body 20, which brings conveniences for users to reach the mother boards 211, 221, 231, 241 and replace elements. The pivot type may utilize the right/left side-pivot ones shown in the drawings to rotate horizontally, or change to a top/bottom side-pivot configuration to rotate vertically. When the pivot type is the right/left side-pivot configuration, all connectors on the mother boards 211, 221, 231, 241 with cables may be arranged close to the pivot sides of the side walls to allow all cables gathered along the pivots, without interferences with the rotation operation of the side walls. Similarly, when the pivot type is the top/bottom side-pivot configuration, all cables of the mother boards 211, 221, 231, 241 will be arranged to extend upwards or downwards to avoid rotation interferences.

The practical structure of the rack body may be various. In certain situations, the rack body 20 is combined from foldable side-wall sets. For example, the side walls 21, 22 is pivoted together to fold up or extend as a single plane, so as the side walls 23, 24. Specific fastening members will be applied to hold these two sets tight and solidly. This design helps to a compact package for transportation, storage and hand-carry.

Meanwhile, the tubelike computer module 2 may configured with other modules to build up a complete computer system. The first opening 25 of the rack body 20 may be removably coupled with a top cover 41, while at the second opening 26 a pedestal 42 is configured therewith.

The top cover 41, a rectangular mask corresponding to the first opening 25, includes plural through holes 411 for the airflow. Two cooling fans 32, 33 may be configured inside the top cover 41, or at the first/second opening 25/26. The amount, size, speed of the cooling fans 32, 33 should be decided according the actual requirements of the multi-processor system. In some cases, a single cooling fan about the inner size of the top cover 41 may lead to a low noise result because it provides the some airflow rate with a lower speed. Certainly, arranging smaller fans in matrix is a common solution. The power supply of the cooling fans 32, 33 may be provided by several power supply modules configured in the pedestal 42. A simple way to arrange the power cables is along with corners of the rack body 20. Another practical solution is to use a cable pipe 61 (FIG. 6) pass through the center of the airflow channel 27 vertically to avoid barriers or split against the airflow.

Accordingly, when the cooling fans 32, 33 drive the airflow 90 to pass the airflow channel 27, the airflow 90 will not be blocked, hindered or split, or passing through narrow channels. The airflow 90 will then pass the unitary, continuous and non-segment airflow channel 27 of the rack body 20 to carry away the heats conducted by the heat sinks 31. Yet the tubelike computer module 2 reduces wind noises and increases the heat-dissipation efficiency.

Figure 6:
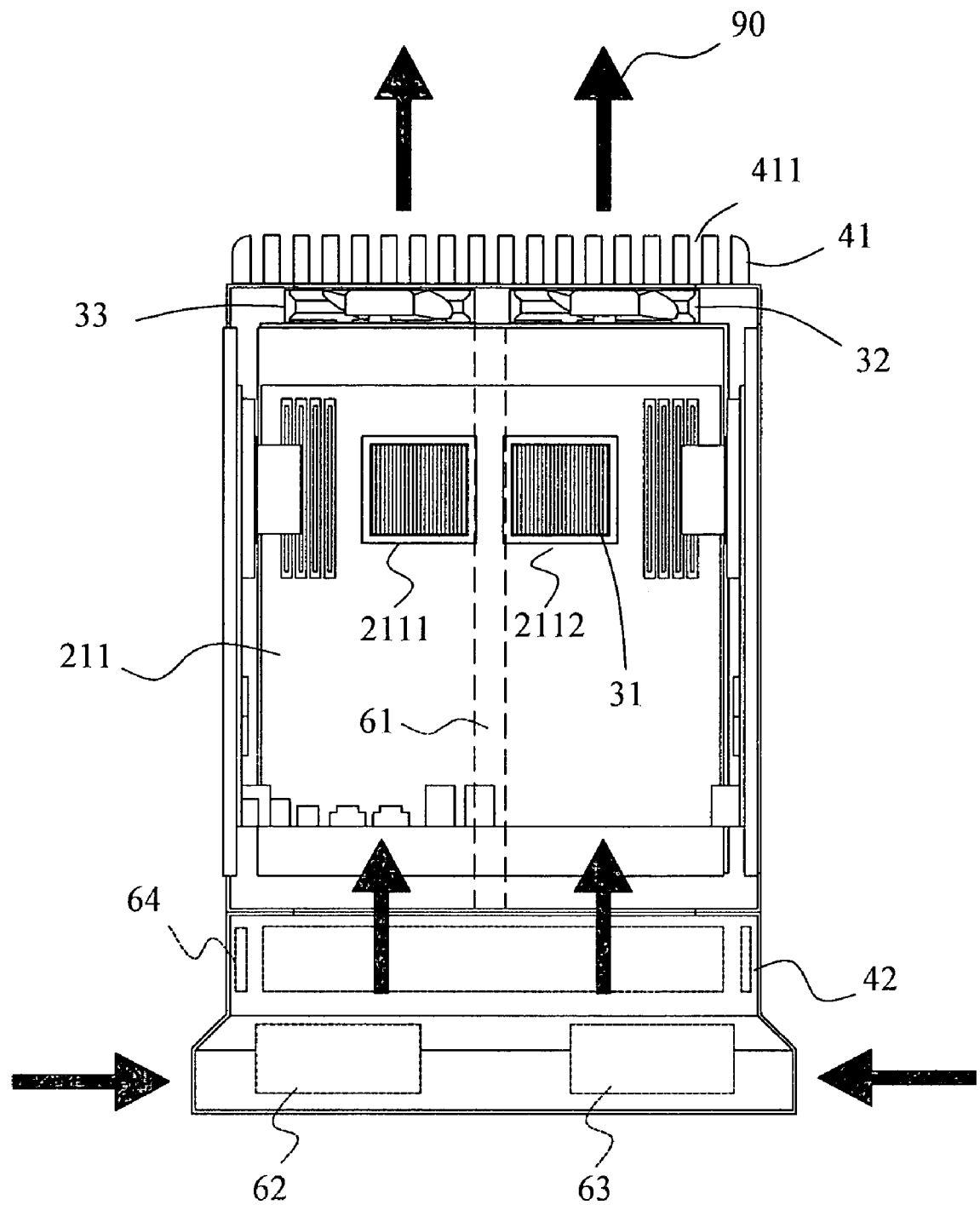
FIG. 6 is a detailed explanatory drawing for the pedestal of the multi-processor system according to the present invention.

The pedestal 42 is for containing other electrical components or modules, such as power supplies, system switches, hard disks, other fans or cooling systems, or head nodes for cluster computing. In FIG. 6, the power supply modules 62, 63 of the multi-processor system are equipped with centrifugal fans, which sucks in air from plural apertures 421 of the pedestal 42 (shown in FIGS. 2A, 2B) and through the lateral sides of the power supply modules 62, 63, then output air through the top side to enter the tubelike computer module 2. The generated airflow flows upwards and pass the second opening 26, the airflow channel 27 and the first opening 25 of the rack body 20, and join the airflow 90 generated by the cooling fans 32,33 at the top as an additional driving force. The direction of the airflow may be reversed according to the actual requirements.

The outer space at the top side power supply modules 62, 63 should not be blocked as well. Various system switches 64 of the multi-processor system, such as power switch board, KVM (Keyboard-Video-Mouse) switch board, fan switch board, other I/O switch boards or NVIDIA SLI™ (Scalable Link Interface) may be configured at the upper half of the pedestal 42, parallel and close to the lateral walls of the pedestal 42.

Proper locations for arranging the hard disks (not shown) of the multi-processor system are: (1) the lateral spaces of the top cover 41; (2) unused spaces on the insides of the side walls 21, 22, 23, 24 of the rack body 20; (3) unused spaces close to the mother boards 211, 221, 231, 241 (need supporting members or suspended disk trays); and (4) unused spaces close to the lateral walls of the pedestal 42. A better way to arrange the hard disks, especially for 2.5 inches disk size, is to set them up vertically, which means parallel to the mother boards 211, 221, 231, 241, the side walls 21, 22, 23, 24 of the rack body 20 or the lateral walls of the pedestal 42. For 1.8 inches or smaller hard disks, horizontal arrangement may be acceptable.

The arrangement of cooling systems should have similar considerations. Only cooling fans need to be arranged at the path of the airflow channel.

Figure 5:
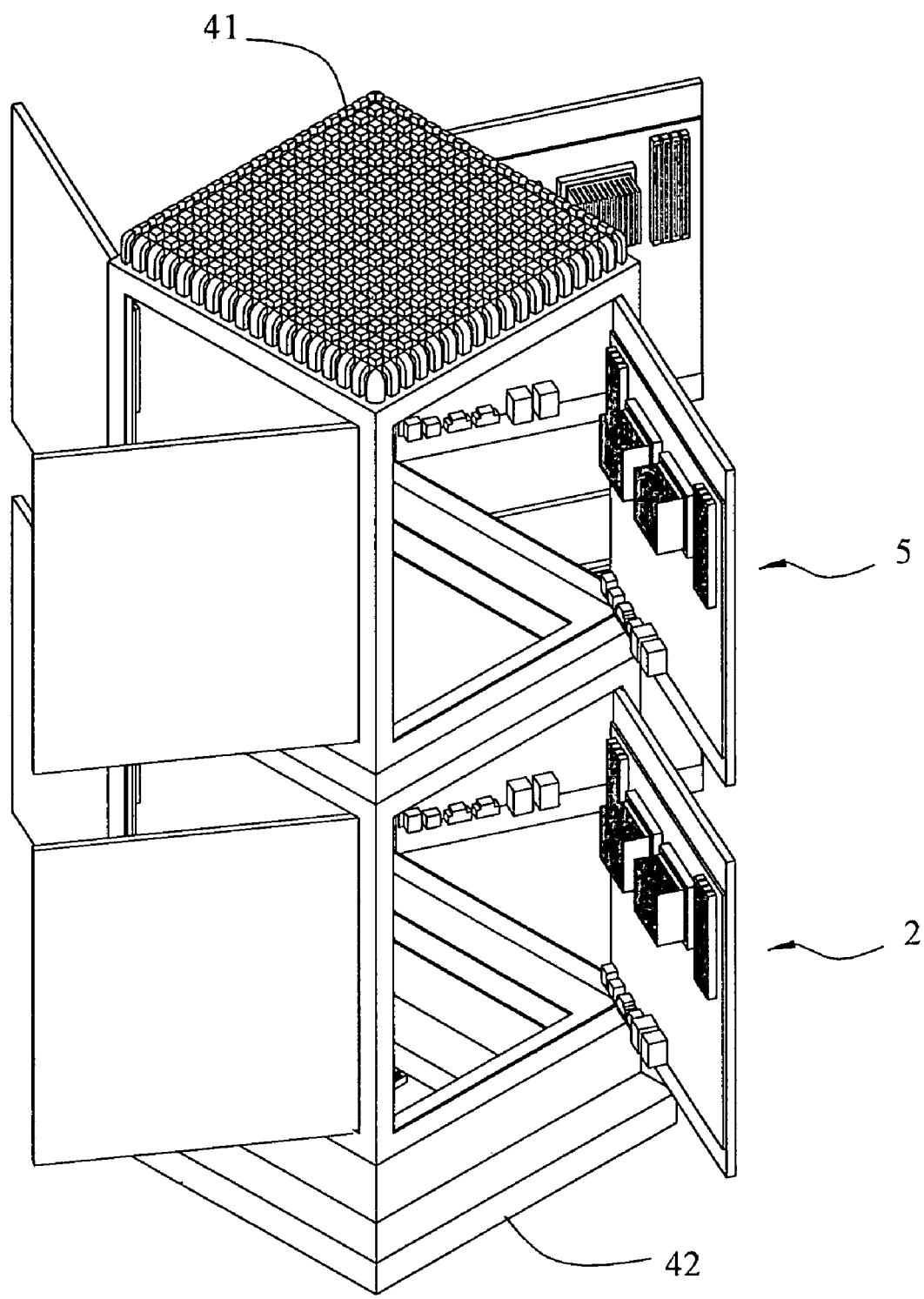
FIG. 5 is an explanatory drawing of the multi-processor system according to another embodiment of the present invention.

In another embodiment of the present invention, a second tubelike computer module 5 (with a second rack body, a second airflow channel and plural second mother boards, not shown) is coupled to the first opening 25 of the tubelike computer module 2 to set up an 8-way system, as shown in FIG. 5, while the pedestal 42 and the top cover 41 is configured at the top and bottom of the two modules. Thus enable both two airflow channels to link together. The tubelike computer module 5 may be configured with the second opening 26. Same concepts may be applied to a system with multiple tubelike computer modules to achieve rich expansibility. For specific situations, the top cover 41 may be removed or adapted to a pipe terminal of a central air condition system in a building to obtain pre-cooled airflow.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A tubelike computer module, comprising:
   a rack body, having a plurality of adjacent side walls to form a first opening and a second opening; and
   a plurality of mother boards each having at least one processor;
   wherein each of the mother boards are configured onto the side walls respectively, thereby defining a non-segment airflow channel between the first opening and the second opening.

2. The tubelike computer module of claim 1, wherein each of the side walls is rotatably pivoted onto the rack body to enable rotation relative to the rack body.

3. The tubelike computer module of claim 1 further comprising at least one hard disk configured on the side walls or the mother boards, or between the side walls and the mother boards.

4. The tubelike computer module of claim 3, wherein the hard disk is arranged parallel to the coupled side walls or the coupled mother boards.

5. The tubelike computer module of claim 1 further comprising at least one cooling fan at the path of the airflow channel.

6. The tubelike computer module of claim 1, wherein the shape of the rack body is a polygon pillar or a polyhedron.

7. A multi-processor system, comprising:
   a rack body, having a plurality of adjacent side walls to form a first opening and a second opening;
   a plurality of mother boards each having at least one processor, each of the mother boards being configured onto the side walls respectively to define a non-segment airflow channel between the first opening and the second opening;
   a plurality of heat sinks coupled corresponding to the processors of the mother boards; and
   at least one cooling fan configured at the path of the airflow channel for generating an airflow through the airflow channel.

8. The multi-processor system of claim 7, wherein each of the side walls is rotatably pivoted onto the rack body to enable rotation relative to the rack body.

9. The multi-processor system of claim 7, wherein the rack body further comprises a top cover coupled to the first opening of the rack body, the top cover having a plurality of through holes.

10. The multi-processor system of claim 9, wherein the cooling fan is configured at the first opening or the second opening, or in the top cover.

11. The multi-processor system of claim 9 further comprising at least one hard disk configured in the rack body or in the top cover.

12. The multi-processor system of claim 7 further comprising a pedestal configured at the second opening of the rack body.

13. The multi-processor system of claim 12, wherein the pedestal comprises a plurality of power supply modules.

14. The multi-processor system of claim 13, wherein each of the power supply modules comprises a centrifugal fan.

15. The multi-processor system of claim 12, wherein the pedestal further comprises a plurality of apertures for the airflow.

16. The multi-processor system of claim 12, wherein the cooling fan is configured in the pedestal.

17. The multi-processor system of claim 12, wherein the pedestal further comprises one or more system switches selected from the group of a power switch board, a KVM (Keyboard-Video-Mouse) switch board, a fan switch board, an I/O switch board or an NVIDIA SLI™ (Scalable Link Interface).

18. The multi-processor system of claim 12 further comprising at least one hard disk configured in the pedestal.

19. The multi-processor system of claim 7, wherein the shape of the rack body is a polygon pillar or a polyhedron.

20. The multi-processor system of claim 7 further comprising a second rack body with a second airflow channel coupled to the first opening or the second opening of the rack body, thereby enabling the airflow channel and the second airflow channel thereof to link together.

* * * * *